United States Patent

Newson et al.

[11] Patent Number: 6,006,953
[45] Date of Patent: Dec. 28, 1999

[54] PRESET QUANTITY FLUID DELIVERY APPARATUS

[76] Inventors: Richard John Newson, 28 Ferry Road, Days Bay, Wellington; Dean Mark Bowden, 14a McMannaway Grove, Stokes Valley, Wellington, both of New Zealand, 6008

[21] Appl. No.: 08/632,489
[22] PCT Filed: Oct. 20, 1994
[86] PCT No.: PCT/NZ94/00116
§ 371 Date: Oct. 18, 1996
§ 102(e) Date: Oct. 18, 1996
[87] PCT Pub. No.: WO95/11428
PCT Pub. Date: Apr. 27, 1995

[30] Foreign Application Priority Data

Oct. 20, 1993 [NZ]  New Zealand ............................ 250010

[51] Int. Cl.[6] .................................................. B67D 5/64
[52] U.S. Cl. ............................................................. 222/334
[58] Field of Search .................................... 222/385, 389, 222/401, 263, 334, 373, 400.8, 175, 626; 239/99, 161, 152, 154

[56] References Cited

U.S. PATENT DOCUMENTS

| | | | |
|---|---|---|---|
| 1,896,036 | 1/1933 | Bell | 222/363 |
| 2,142,973 | 1/1939 | Draper | 239/92 |
| 3,292,867 | 12/1966 | Hunter | 222/389 X |
| 4,157,773 | 6/1979 | Schetina et al. | 222/334 X |
| 4,222,358 | 9/1980 | Hofbauer | 239/92 X |
| 4,438,872 | 3/1984 | Dooley et al. | 222/334 X |
| 4,485,971 | 12/1984 | Pajevic | 222/401 X |
| 5,398,873 | 3/1995 | Johnson et al. | 239/99 |

*Primary Examiner*—Kevin Weldon
*Attorney, Agent, or Firm*—Thomas R. Vigil

[57] ABSTRACT

Apparatus for delivering constant quantities of fluid, comprises a chamber, a piston (6) reciprocally movably within the chamber, a fluid inlet (3) to the chamber on one side of the piston, and a fluid outlet (5) from the chamber on the other side of the piston (6). A valve (12) through the outlet side of the chamber to the fluid outlet (5). Spring means (10) urges the piston (6) and subsidiary spring means (16) urges the valve (12) through the piston (6) towards the inlet side of the chamber, such that fluid pressure on the inlet side of the chamber will cause the piston (6) to move to eject a predetermined quantity of fluid from the outlet side, and on the return stroke fluid will flow through the valve (12) in the piston (6) to refill the outlet side for the subsequent piston delivery stroke.

8 Claims, 3 Drawing Sheets

PRESET QUANTITY FLUID DELIVERY APPARATUS

This application Ser. No. 08/632489 is the national stage of PCT/NZ9A/00116.

The invention comprises an apparatus or a device for delivering a preset quantity of fluid.

BACKGROUND

In forestry or horticulture it is often required to deliver a preset quantity of fluid such as liquid herbicide or liquid fertiliser from a sprayer. In forestry or farm forestry for example, herbicide is spot sprayed to cover typically 1m$^2$ of surrounding ground prior to planting a seedling, or alternatively once a seedling has been planted a shot of selective herbicide is sprayed over the seedling and surrounding ground after planting. A forestry worker may spray a large number of seedlings over the course of a day. It is necessary that a constant amount of herbicide is sprayed around each seedling. Herbicides are expensive and it is also potentially hazardous to use more than is required, but at the same time it is essential that enough herbicide is sprayed around each seedling to do the job. In horticulture it is also often necessary to deliver preset quantities of herbicides, or alternatively liquid fertiliser or the like on or around plants. Again, manually operated back sprayers are often used.

A back pack sprayer typically consists of a tank for the herbicide or fertilizer to be sprayed, which is carried on the back of the operator like a pack. There is also an outlet hose from the tank and a delivery gun used by the operator which is usually trigger operated. There is also a handle which the operator pumps to pressurise the sprayer so that when the operator pulls the trigger of the spray gun the fluid will be delivered as a spray. Delivering a constant quantity of the herbicide or fertiliser requires that the operator maintains a constant pressure and holds the trigger open for a constant period in each operation, which is obviously only a rough estimation.

In another type of sprayer, instead of the spray tank being pressurised the hand held spray gun is based on a modified drench gun and has a pump-action trigger which when squeezed causes spray to be ejected. The squeezing action on each operation pumps the spray, so that when the device is used repeatedly the operators hand quickly becomes tired.

Back pack sprayers incorporating an electric solenoid valve and battery are known. The electric solenoid delivers a constant quantity of spray on each operation, but these sprayers require a power source to operate and are dependent on battery life.

SUMMARY OF INVENTION

The invention provides an improved or at least alternative apparatus for delivering constant quantities of fluid.

In broad terms a first form of the invention comprises apparatus for delivering constant quantities of fluid, comprising a chamber, a piston reciprocally movable within the chamber, a fluid inlet to the chamber on one side of the piston, a fluid outlet from the chamber on the other side of the piston, a valve through the piston including a valve stem extending through the outlet side of the chamber to the fluid outlet, and spring means and subsidiary spring means urging respectively the piston and valve through the piston towards the inlet side of the chamber, such that fluid pressure on the inlet side of the chamber will cause the piston to move to eject a predetermined quantity of fluid from the outlet side and on the return stroke fluid will flow through the valve in the piston to refill the outlet side for the subsequent piston delivery stroke.

DESCRIPTION OF DRAWINGS

Two preferred forms of the apparatus of the invention are illustrated in the accompanying drawings, by way of example and without intending to be limiting. In the drawings.

DETAILED DESCRIPTION OF PREFERRED FORMS

Figure 3:
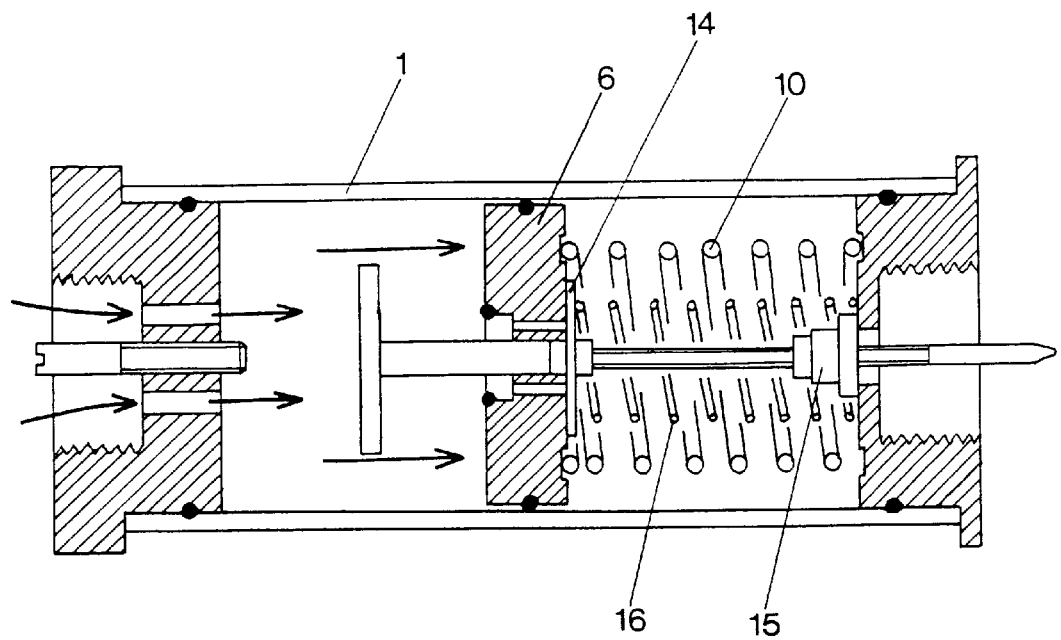
FIG. 3 shows the first preferred form of the device at the end of the delivery stroke.
Figure 4:
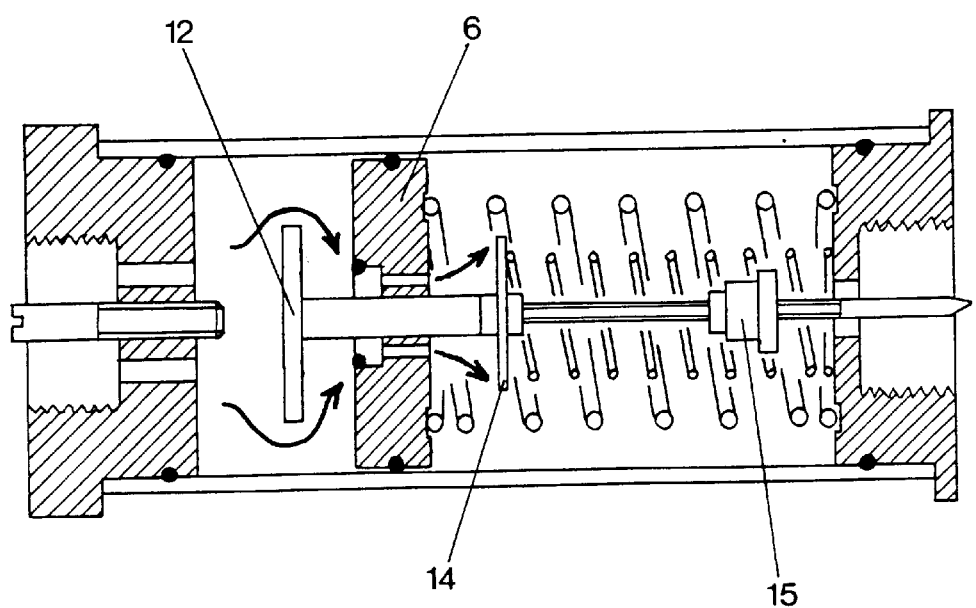
FIG. 4 shows the first preferred form of the device part way through the return stroke.
Figure 5:
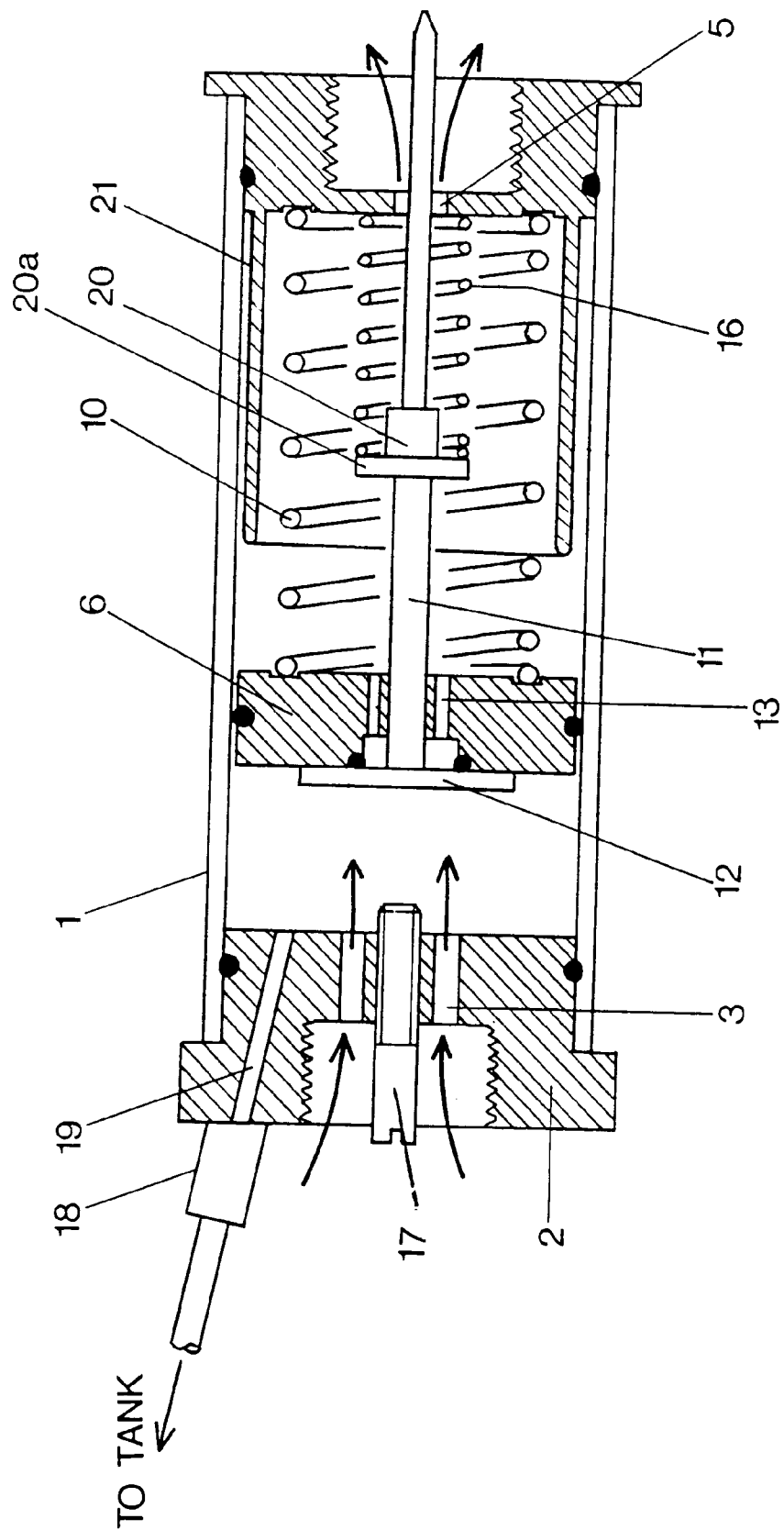
FIG. 5 shows a second preferred form of the device part way through the delivery stroke.

The forms of the device shown in FIGS. 1 to 4 and in FIG. 5 both comprise a cylinder 1 with an inlet end cap 2 and outlet end cap 4. One or more bores 3 through the inlet end cap form an inlet to the interior of the cylinder 1 while one or more bores 5 through the outlet end cap forms an outlet from the cylinder 1. A piston 6 with a peripheral o-ring seal such as a silicon sealing ring is reciprocally movable in the cylinder 1.

The preferred forms of the device shown in the drawings are intended for use with a back pack sprayer. As previously stated a back pack sprayer comprises a tank carried on the operator's back, a supply hose to a hand held trigger operated spray gun, and a nozzle assembly. To fit the devices shown in the drawings the knapsack wand is unscrewed from the trigger assembly of the spray gun. In place of the wand the device is then threaded onto the hand held trigger assembly by way of the threaded bore 8 in the inlet and cap 2, and a nozzle assembly is screwed into the threaded bore 9 on the outlet end cap. In use, when the trigger of the back pack sprayer is operated fluid can flow from the spray tank through the inlet bores 3 into the interior of the cylinder 1 on the inlet side of the piston 6. Similarly on the outlet side, fluid from the outlet 5 is ejected through the spray nozzle screwed into the bore 9.

Figure 1:
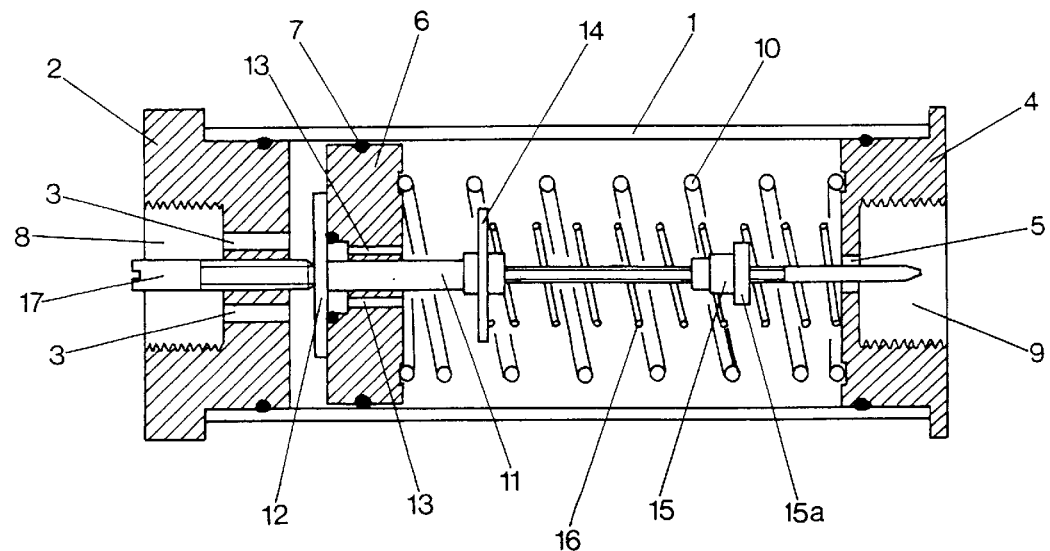
FIG. 1 shows a first preferred form of the device at rest i.e. with no fluid pressure on the inlet side of the device.
Figure 2:
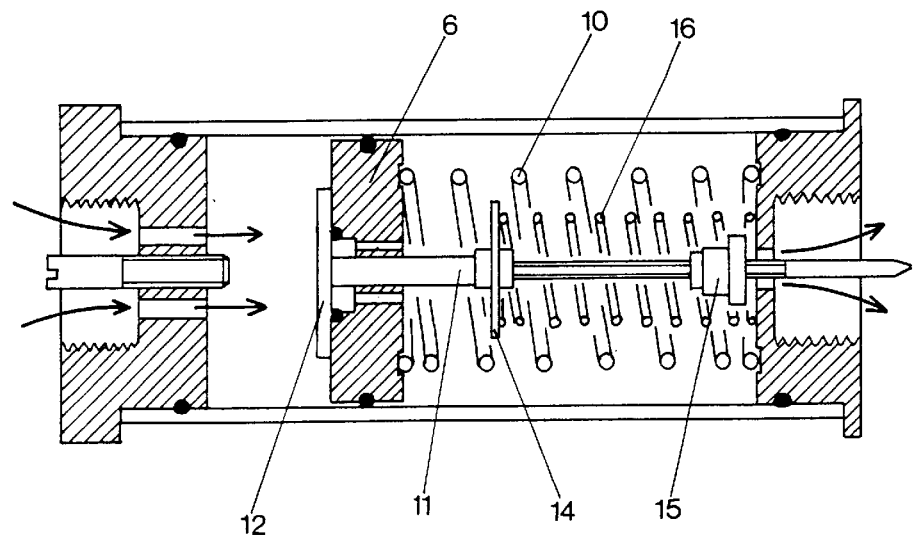
FIG. 2 shows the first preferred form of the device part way through a delivery stroke.

Referring to FIGS. 1 to 4 the piston 6 can more between its normal position shown in FIG. 1, and the position shown in FIG. 3. A spring 10 urges the piston towards its normal position of FIG. 1. When the spray gun is operated so that fluid under pressure can flow into the inlet side of the cylinder, the piston is moved towards the position shown in FIG. 3 overcoming and compressing the spring 10, as will be further described.

Again in both forms shown in the drawings, a valve through the centre of the piston comprises a valve stem 11 and valve head 12. The piston is slidably mounted on the valve stem 11 so that the piston 6 can move on the valve stem 11 and vice versa the valve 11/12 can move within a bore through the piston (compare FIGS. 1, 3 and 4). Transfer bores 13 are provided through the piston 6 from the inlet side to the outlet side. When the valve 11/12 is in the position shown in FIGS. 1 and 2 the valve head 12 seals the transfer bores 13. When the valve 11/12 is in the position shown in FIG. 4, fluid can flow from the inlet side of the cylinder 1 through the transfer bores 13 to the outlet side.

In the form of the device shown in FIGS. 1 and 4 the valve stem 11 also mounts a circular flange 14 part way along its length, and a stop 15 at or near its end. The stop 15 may comprise a rubber seal 15a. When the valve 12/13 is in its position of further most travel, the stop 15 seals the outlet 5 through the outlet end cap 4 to prevent further fluid flow from the outlet 5, as shown in FIG. 3. The flange 14 forms a stop for travel of the piston 6. A subsidiary spring 16 urges the valve 12/13 towards its normal position as shown in FIG. 1.

Operation of the device as shown in FIGS. 1 to 4 is as follows: When the trigger of a back pack sprayer or the like is operated, fluid under pressure flows through the bores 3 into the cylinder 1 non the inlet side of the piston. As fluid flows into the cylinder 1 of the fluid pressure presses the valve head 12 against the face of the piston holding the transfer bores 13 closed, and pushes the piston 6 and valve 11/12 through the cylinder 1 as shown in FIG. 2, overcoming the spring 10. During travel of the piston from fluid pressure on the inlet side of the cylinder 1, fluid on the outlet side of the piston is expelled from the outlet 5. FIG. 2 shows the piston moving within the cylinder expelling fluid from the outlet 5, and also shows the stop 15 about to close the outlet 5 to prevent further fluid delivery. After the stop 15a has closed the outlet 5 from the device, the piston 6 continues to move through the cylinder 1 sliding on the valve stem 11 further compressing the spring 10, until the piston 6 hits the flange 14 in the position shown in FIG. 3. The mechanism remains in this position until the operator releases the trigger, releasing the fluid pressure through the inlet bores 3 on the piston. When the trigger is released and fluid pressure on the inlet side of the piston is released, the springs 10 and 16 push the piston 6 and the valve 11/12 back to their normal positions of FIG. 1. FIG. 4 shows the piston and valve part way through their return strokes. Because of its smaller head 12, the valve 11/12 moves, the valve head 12 will lift off the face of the piston 6 opening the transfer bores 13. As the piston 6 is pushed through the cylinder 1 towards its home position by the spring 10, fluid on the inlet side of the piston which had previously entered the cylinder while the trigger was operated will be forced to flow through the transfer bores 13 to refill the outlet side of the cylinder. This will continue to occur for so long as the valve head 12 and piston 6 are separated i.e. until the piston 6 reaches its home position/catches up with the valve 11/12 at which point the piston 6 will reseat against the valve head 12 closing the transfer bores 13—the piston is returned to the position shown in FIG. 1. On each operation of the trigger of the sprayer the same sequence of events takes place, delivering a set quantity of fluid.

In contrast to the device described in FIGS. 1 to 4 in the device of FIG. 5 the flange 14 and stop 15 on the valve stem 11 are omitted. The spring 16 to urge the valve 11/12 towards the normal position (as shown in FIG. 1) remains and seats against spring seat 20a of collar 20.

The limit of movement of the piston 6 is defined by a projecting cylinder 21 which extends from the end cap into the interior of the device as shown in FIG. 5, instead of the stop 15 on the valve stem 11.

A pressure release valve 18 is connected to the inlet side of the cylinder via a bore 19 through the inlet cap 2. The pressure release valve 18 is connected to the tank on the operators back via a hose or the like (not shown).

Operation of the FIG. 5 device is very similar to that of FIGS. 1 to 4, but is described fully as follows:

When the trigger of a back pack sprayer or the like is operated fluid under pressure flows through the bores 3 into the cylinder 1 on the inlet side of the piston. This fluid pressure presses the valve head 12 against the face of the piston 6 holding the transfer bores 13 closed, and pushes the piston 6 and valve 11/12 through the cylinder 1 overcoming the urging of spring 10. During travel of the piston 6 within the cylinder 1 fluid on the outlet side of the piston is expelled via the outlet bores 5 as in the FIGS. 1 to 4 form of the device. The piston 6 moves until it hits the stops 21. The mechanism remains in this position until the operator releases the trigger, releasing the fluid on the inlet side of the chamber 1. When the trigger is released and fluid pressure on the inlet side of the piston is released, the springs 10 and 16 push the piston 6 and valve 11/12 back toward their starting position (as in FIG. 1). As described in connection with FIGS. 1 to 4, the valve 11/12 moves more quickly than the piston 6 and as the valve 11/12 moves, the valve head 12 will lift off the face of the piston 6 opening the transfer bores 13. As the piston 6 is pushed through the cylinder 1 toward its home position by the spring 10 fluid on the inlet side of the piston which had previously entered the cylinder while the trigger was operated will be forced through the transfer bores 13 to refill the outlet side of the cylinder. This will continue to occur for so long as the valve head 12 and piston 6 are separated. The pressure release valve 18 allows for a pressure drop on the inlet side of the device to guard against fluid lockup as the piston more back towards the inlet to the chamber.

Adjustment of the quantity of fluid delivered from the outlet bore 5 on each operation (which depends on the length of the piston stroke), can be adjusted by an adjustor 17 threadedly mounted in the end cap 2 which limits the piston travel. To increase the quantity of fluid delivered the adjustor 17 is backed off allowing the piston 6 to more further towards the inlet end cap 2 in its return stroke, and vice versa to reduce the quantity of fluid delivered in each piston stroke.

The preferred forms of the device described above and shown in the drawings are intended for fitting to an existing back pack or similar sprayer, between the trigger assembly and outlet nozzle. However, the invention is not limited to such applications and it is quite possible for a single unit spray gun to incorporate an integral delivery device of the invention. The delivery device of the invention is also not limited to manual delivery systems such as back pack sprayers which are pressurised by hand, but can equally be used with a spraying system or any other apparatus which delivers fluid which is pressurised by a motor or pump, where it is required to repeatedly deliver set quantities of fluid.

The devices of the invention are also not limited to forestry or horticultural or agricultural spraying operations. For example, a dosing gum for dosing animals such as sheep or cows could incorporate a repeated quantity delivery device of the invention for delivering a set quantity of medicine or vaccine etc at each dose. The mechanisms of the invention could also be incorporated in any industrial apparatus for delivering liquids or gasses or pasty substances or grease etc. The device could be large as in an industrial application for delivering quantities of fluid such as a number of liters on each operation, or very small in a "miniaturised" form for small scale applications for delivering only a few cc's per stroke. The device need not necessarily be connected to a manually operated trigger— the trigger initiating the device could be any form of automatically controlled valve or fluid switch controlled by a solenoid or any other type of control system.

The foregoing describes the invention including preferred forms thereof. Alterations and modifications as will be obvious to those skilled in the art are intended to be incorporated within the scope hereof, as defined in the claims.

We claim:

1. Apparatus for delivering constant quantities of fluid, comprising:

a cylinder having a chamber therein;

a piston reciprocally movable within the chamber;

a fluid inlet to the chamber on one side of the piston;

a fluid outlet from the chamber on the other side of the piston;

at least one fluid transfer bore through the piston from the inlet side of the chamber on one side of the piston to the outlet side of the chamber on the other side of the piston;

a movable valve extending through the piston and comprising a valve head on the inlet side of the chamber which closes the at least one fluid transfer bore when the calve head is against the piston on the inlet side, and a valve stem extending from the valve head through a bore through the piston and through the outlet side of the chamber to the fluid outlet with valve stem being movable through the piston and the piston being movable along a portion of the valve stem on one side of the valve head;

means on the fluid outlet side of the chamber which defines the limit of furthermost travel of the piston towards the fluid outlet; and spring means urging the piston towards the inlet side of the chamber and subsidiary spring means urging the valve through the piston towards the inlet side of the chamber, such that fluid pressure on the inlet side of the chamber will cause the piston to move to eject a predetermined quantity of fluid from the outlet side of the chamber through the fluid outlet and on the return stroke fluid will flow through the at least one fluid transfer bore in the piston to refill the outlet side for the subsequent piston delivery stroke.

2. Apparatus according to claim 1 wherein said means on the fluid outlet side of the chamber which defines the limit of furthermore travel of the piston towards the fluid outlet comprises means carried on the valve stem on the outlet side of the chamber.

3. Apparatus according to claim 1 wherein the means on the fluid outlet side of the chamber which defines the limit of furthermost travel of the piston towards the fluid outlet comprises means on the fluid outlet side of the chamber against which the piston abuts at the limit of furthermost travel of the piston towards the fluid outlet.

4. Apparatus according to claim 1 comprising stop means carried on the valve stem on the outlet side of the chamber and positioned so that the stop means will close the fluid outlet when the valve stem is in its position of furthermost travel towards the fluid outlet.

5. Apparatus according to claim 2 comprising stop means carried on the valve stem on the outlet side of the chamber and positioned so that the stop means will close the fluid outlet when the valve stem is in its position of furthermost travel towards the fluid outlet.

6. Apparatus according to claim 3 comprising stop means carried on the valve stem on the outlet side of the chamber and positioned so that the stop means will close the fluid outlet when the valve stem is in its position of furthermost travel towards the fluid outlet.

7. Apparatus according to claim 1 wherein the inlet is screw threaded to enable threaded connection of the apparatus to a fluid supply conduit, and the outlet is screw threaded to enable threaded connection to a fluid outlet nozzle.

8. Apparatus according to claim 1 combined with a back pack sprayer comprising a tank, a hand operated trigger assembly connected to the inlet side of said apparatus, a supply hose between the tank and the trigger assembly, and an outlet nozzle connectable to the outlet of said apparatus.

* * * * *